United States Patent
Jaubert et al.

(10) Patent No.: US 6,741,241 B1
(45) Date of Patent: May 25, 2004

(54) GENERATING REGISTRATION DATA FOR A VIRTUAL SET

(75) Inventors: Fabrice B. Jaubert, Montreal (CA); Bernard Malenfant, Montreal (CA)

(73) Assignee: Autodesk Canada Inc., Quebec (CA)

( * ) Notice: Subject to any disclaimer, the term of this patent is extended or adjusted under 35 U.S.C. 154(b) by 512 days.

(21) Appl. No.: 09/252,928

(22) Filed: Feb. 19, 1999

(30) Foreign Application Priority Data

Feb. 20, 1998 (GB) .............................. 9803551

(51) Int. Cl.[7] .............................. G06T 15/00
(52) U.S. Cl. ..................................... 345/419
(58) Field of Search ................ 345/419, 427, 345/429, 425, 418, 581, 679, 680

(56) References Cited

U.S. PATENT DOCUMENTS

| 5,436,672 A | 7/1995 | Medioni et al. ............ 348/591 |
| 5,479,597 A | 12/1995 | Fellous |
| 5,949,433 A | 9/1999 | Klotz |
| 5,973,733 A * | 10/1999 | Gove .......................... 348/208 |
| 6,100,925 A * | 8/2000 | Rosser et al. ................ 348/169 |
| 6,133,943 A * | 10/2000 | Nedham ....................... 348/37 |
| 6,181,345 B1 * | 1/2001 | Richard ....................... 345/419 |

FOREIGN PATENT DOCUMENTS

| GB | 2312125 A * | 10/1997 |
| WO | WO 95/30313 | 11/1995 |
| WO | WO 97/28654 | 8/1997 |

* cited by examiner

Primary Examiner—Kee M. Tung
Assistant Examiner—Huedung X. Cao

(57) ABSTRACT

In a virtual set a computer generated virtual image is combined with a real set. Registration data defines a transformation allowing virtual image data to be combined with image data derived from a real set. A reference plane is identified (902) in the real set which is associated (903) to a plane defined in the virtual world space. Differences in positions between the real and virtual planes are determined (904) to produce registration data.

24 Claims, 18 Drawing Sheets

```
PLANEBEGIN
3101    -0.6746  0.0557  -3.8372
3102    -1.2495  0.056   -2.37
3103     1.4305  0.0571  -1.5249
3104     1.3593  0.061   -3.4074
PLANEEND
WH
0        5

PLANEBEGIN
3201     2.412   1.8382  -4.6495
3202     2.4147  1.0387  -4.5260
3203     2.4443  1.1424  -3.3388
3214     2.4658  0.8697  -2.4977
3215     2.4672  1.8544  -2.4173
3216     2.4420  1.7114  -3.4728
PLANEEND
WH
4        4

PLANEBEGIN
3301    -1.2673  1.7752  -4.8105
3302    -1.3321  1.0361  -4.8081
3303     0.064   0.8849  -4.8399
3304     1.992   1.0342  -4.8881
3305     1.8026  1.961   -4.8828
3306     0.117   1.73    -4.8396
3307     0.0     1.4399  -4.838
PLANEEND
WH
4        4
```

301

$ax + by + cz + d = 0$; where $a = y2.z3 - y2.z1 - y1.z3 + y1.z1 - z2.y3 + z2.y1 + z1.y3 - z1.y1$ $b = z2.x3 - z2.x1 - z1.x3 + z1.x1 - x2.z3 + x2.z1 + x1.z3 - x1.z1$ $c = x2.y3 - x2.y1 - x1.y3 + x1.y1 - y2.x3 + y2.x1 + y1.x3 - y1.x1$ $d = -(x1.a + y1.b + z1.c)$

Figure 10

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix} \underbrace{\phantom{xx}}_{1301} \quad = \quad \text{IDENTITY MATRIX} \;\; mI$$

$$\begin{bmatrix} 1 & 0 & 0 & 0 \\ 0 & \cos AX & -\sin AX & 0 \\ 0 & \sin AX & \cos AX & 0 \\ 0 & 0 & 0 & 1 \end{bmatrix} \underbrace{\phantom{xx}}_{1302} \quad = \quad X \text{ ROTATION MATRIX} \;\; mRx$$

$$\begin{bmatrix} \cos AZ & -\sin AZ & 0 & 0 \\ \sin AZ & \cos AZ & 0 & 0 \\ 0 & 0 & 1 & 0 \\ 0 & 0 & 0 & 1 \end{bmatrix} \underbrace{\phantom{xx}}_{1303} \quad = \quad Z \text{ ROTATION MATRIX} \;\; mRz$$

Figure 13

REGISTRATION MATRIX mR = mI × mRx × mRz + TRANSLATION

1401

$$mR = \begin{bmatrix} \vdots & \vdots & \vdots & T_X \\ \vdots & \vdots & \vdots & T_Y \\ \vdots & \vdots & \vdots & T_Z \\ \vdots & \vdots & \vdots & 1 \end{bmatrix}$$

Registration File - ASCII matrix DEFAULT    {

```
NAME      "SampleScene"
DESCRIPTION   "Sample Scene"

LIGHTMODEL   {
                .
                .
             }

BACKGROUND {
                .
                .
             }

OBJECT   }
         NAME    "FLOOR"
         ID 229
         TYPE
         ANIMATABLE  YES
         HIDDEN  NO
```

Figure 16

GENERATING REGISTRATION DATA FOR A VIRTUAL SET

The present invention relates to generating registration data for combining real and virtual images.

INTRODUCTION

For some years, computers have been used to generate three dimensional representations of objects and spaces which, increasingly, have been used for technical and artistic applications. As computer power has increased, it has become possible to generate image frames at or near real time and with increasing spatial definition. Thus, much work has been done in terms of developing computer generated images which appear real and the process of interacting with such environments has become known as "virtual reality".

In the art of computer graphics, a synthesised three dimensional space may be referred to as a virtual world space in which a two dimensional view into said world space is generated from the position of a notional virtual camera within said space, having properties similar to real cameras in the real world.

In U.S. Pat. No. 5,479,597, assigned to the present applicant, virtual or synthesised images are combined with real images to produce a composite output. Thus, part of said output is derived from a virtual world space with the remainder of said output being derived from a real set. Thus, the environment as a whole is known as a virtual set.

An advantage of virtual sets is that relatively little real studio space is required because much larger virtual environments may be represented in the set. Furthermore, virtual sets may be changed almost instantaneously and thereby provide a new creative tool, having capabilities which extend beyond the limitations of real studios, while significantly reducing operational costs.

The generation of a virtual world space, for application within a virtual set, is preferably done as an independent creative exercise, making data sets available to production facilities. However, a problem arises in that the actual geometry of real sets vanes such that the geometry defined by a virtual data set may not align as it should with the real constraints of a virtual studio.

Virtual sets distinguish themselves over established blue screen techniques because of the greater extent to which objects and talent may interact within the virtual environment. However, in order for this interaction to create the desired illusion, it is essential for the virtual world space to accurately align with certain aspects of the geometry of the real set. For example, if talent is to be seen walking upon a floor, it is essential for a floor defined within the virtual world space to accurately align with the real floor of the real set. Further constraints could then be placed on the alignment if the talent is to interact with other virtual objects within the set.

Conventionally, registration of the virtual world space to the real set has been performed manually by trial and error resulting in modifications being made to the world space data in order to align it with a particular real set. This creates two significant disadvantages. Firstly, the alignment process can become time consuming and require significant expertise on the part of the operators. Secondly, each alignment process results in the world space data being modified for that particular real set geometry.

SUMMARY OF THE INVENTION

According to a first aspect of the present invention, there is provided a method of generating registration data for a virtual set, wherein said registration data defines a transformation for virtual scene data to facilitate the combination of said virtual data with image data derived from a real set, comprising steps of identifying a plane in a real set; associating said real plane to a plane defined in a virtual scene; and determining differences in position between said real plane and said virtual plane to produce registration data.

In a preferred embodiment, planes in the real set are defined by identifying the position of a plurality of co-planar points.

In a preferred embodiment, a single plane, preferably the floor, is used for registration purposes but in an alternative embodiment a plurality of planes are identified in the real set and each of these planes is associated to a respective plane in the virtual scene.

Preferably, the virtual scene data is defined by a scene tree, relating a plurality of objects with respect to a root origin.

Preferably, the position determining step includes removing scaling effects from the virtual plane with reference to a scene tree of objects. In a preferred embodiment, the difference determining step also includes determining a relationship between a real plane and a corresponding virtual plane in terms of translations and rotations. Preferably, the rotations and translations are defined by matrices and a registration matrix is generated by a concatenation of rotation and translation matrices.

According to a second aspect of the present invention, there is provided a virtual set for producing image data in which virtual scene data is combined with images derived from a real set, comprising means for generating an image of the real set; rendering means for rendering an image of a virtual set from said virtual scene data, in combination with registration data; and combining means for combining the real image with said rendered image, wherein said registration data is determined by a process of matching a positional attribute of a plane common to said real set and to said virtual set.

Preferably, means are included for determining a relationship between a real plane and a corresponding virtual plane in terms of translation and rotations. Preferably, means are included for defining said rotations and translations in the form of matrices, including means for generating a registration matrix by concatenation of said rotation and translation matrices.

BRIEF DESCRIPTION OF THE DRAWINGS

FIG. 10 illustrates plane equations for the planes of the virtual set;

FIG. 13 illustrates transformation matrices produced by the process shown in FIG. 12;

FIG. 14 details a registration matrix produced by the procedure shown in FIG. 12;

FIG. 15 illustrates an example of a registration matrix stored as an ASCII file;

FIG. 16 illustrates a scene tree of the type shown in FIG. 6 represented as an ASCII file;

DETAILED DESCRIPTION OF THE PREFERRED EMBODIMENTS

Figure 1:
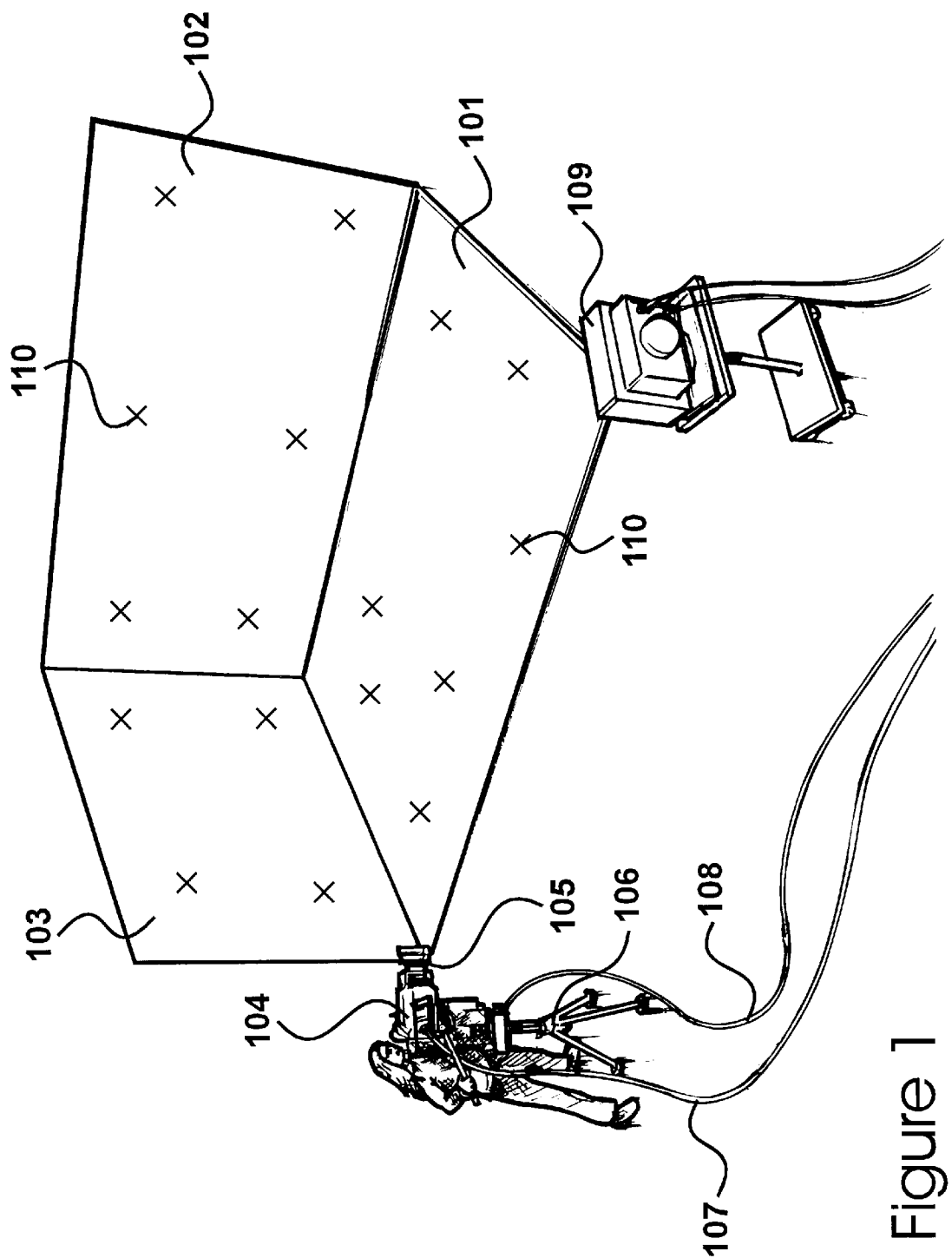
FIG. 1 shows a virtual set in which television pictures are generated in response to talent placed before a chromakeyable screen allowing virtual or synthesised images to be combined therewith.

The invention will now be described by way of example only with reference to the accompanying figures identified above.

A virtual studio, or virtual set is described in British patent publication GB 2 312 125 in the name of the present applicant. The virtual set described in this reference combines images from a virtual world space with real images derived from a real set interactively and in real time. Virtual world space data is generated off-line and it is necessary to align the virtual images with the real geometry of the virtual set in order to produce convincing and acceptable results. The present embodiment is directed towards facilitating the registration of the virtual images with the real images and the technique may be employed for a virtual set of the type described in the aforesaid British patent publication.

The foreground talent and the real objects are combined with a synthesised background by a process of chromakeying, therefore the virtual set itself includes a floor 101, a first wall 102 and a second wall 103, all presenting a saturated blue color to a camera 104. For the purposes of illustration, the floor and wall shown in FIG. 1 join at edges and a corner although in a preferred virtual set, these discontinuities are actually rounded so as to maintain a substantially constant luminance to the camera 104 and to prevent the generation of shadows.

Television camera 104 is fitted with a zoom lens 105 and is rotatably mounted, to allow panning and tilting, on a fixed tripod 106. The camera 104 generates a video signal that is supplied to processing equipment along a video cable 107. The camera also includes sensors configured to generate signals defining the actual pan, rotation, tilt and zoom properties of the camera to generate positional data which is also supplied to processing equipment over a serial data cable 108. In use, talent in the set is able to review the resulting combined real and virtual images by means of a video monitor 109, thus enabling said talent to interact with the virtual world so as to maintain and enhance the illusion.

Virtual images are generated at video rate and require a relatively high definition in order to produce realistic results. Consequently, substantial processing hardware is required and in the present embodiment the process is configured to operate on an Onyx II computer manufactured by Silicon Graphics Inc. In a commercial environment, the use of such equipment needs to be optimised therefore the creation of virtual world spaces for application within the virtual set tends to be done as an off-line process, generating data files which are then made accessible to the real time processing system. World space data has its own frame of reference and objects within said world space are defined positionally with reference to a local origin. The illusion is created by transferring the spatial environment of the virtual world into the real set; therefore it is possible that walls 102 and 103, for example, would not be perceived as walls when combined with the virtual images: their presence merely being there to provide a blue screen background. However, as greater and greater interaction is required between the virtual environment and the real talent, it becomes necessary to define more constraints for combining the real geometry of the set with the virtual world geometry of the synthesised image.

The process of establishing how a real set and a virtual world space are combined is referred to as registration. Thus it is only possible, in all but the most trivial of applications, to establish a working virtual set (in which real talent interacts with a synthesized background) after performing a process of registration, so as to align particular virtual world space data with the geometry of a real set. The set shown in FIG. 1 represents a situation in which equipment is being calibrated for subsequent use. After walls 101, 102 and 103 have been constructed, it is necessary to establish their accurate position in three dimensional space. In order to achieve this, visible markers 110 are applied to walls 101, 102 and 103 with at least three markers being applied to each of said walls so as to uniquely define the plane. Preferably, more than three markers are applied to each wall in order to improve accuracy.

Figure 2:
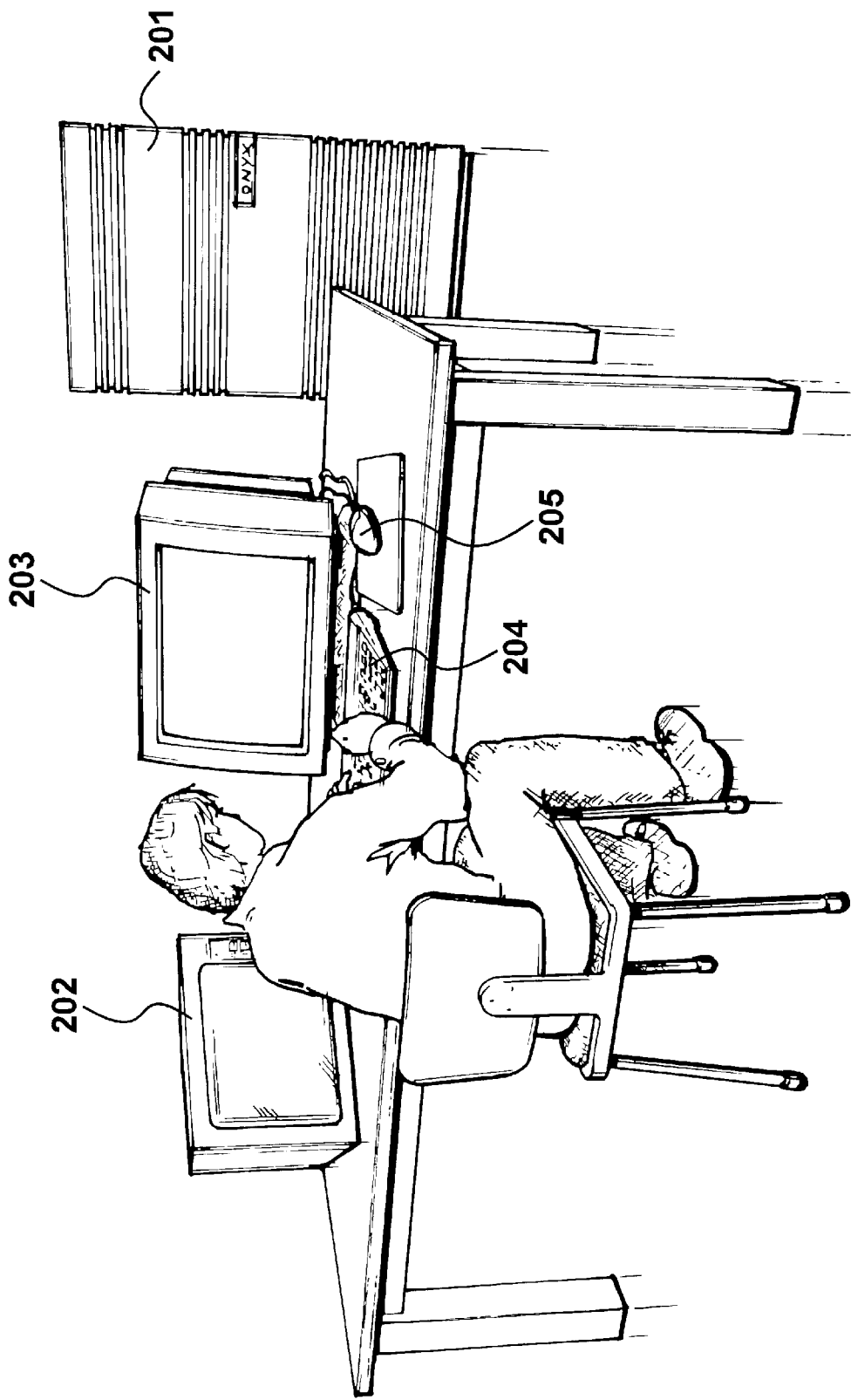
FIG. 2 illustrates a station for generating virtual images and for combining images derived from the real studio shown in FIG. 1, including a video display unit and a data processing system.

The position of each marker 110 is determined by triangulation using a theodolite and the values derived by the theodolite are supplied to a processing system of the type shown in FIG. 2. High definition virtual images generated by processing system 201 are supplied to monitor 109 and to a local video monitor 202, in addition to being supplied as an output video feed. Processing system 201 is controlled by an operator by means of a video display unit 203, a keyboard 204 and a mouse 205. Positional data calculated by means of a theodolite is supplied to the processing system 201 and stored by said system in the form of a file 301 of the type illustrated in FIG. 3. Thus, a first plane is defined by triangulated points 3101, 3102, 3103 and 3104. The position of each point is defined by it's co-ordinates in real space RX, RY, RZ, such that point 3101 is identified by co-ordinates −0.6746, 0.0557 and −3.8372. Origin selection may be arbitrary but by convention the origin tends to be in the centre of the floor on the set; which may also be considered as a preferable hot spot for talent working within the set.

Figure 3:
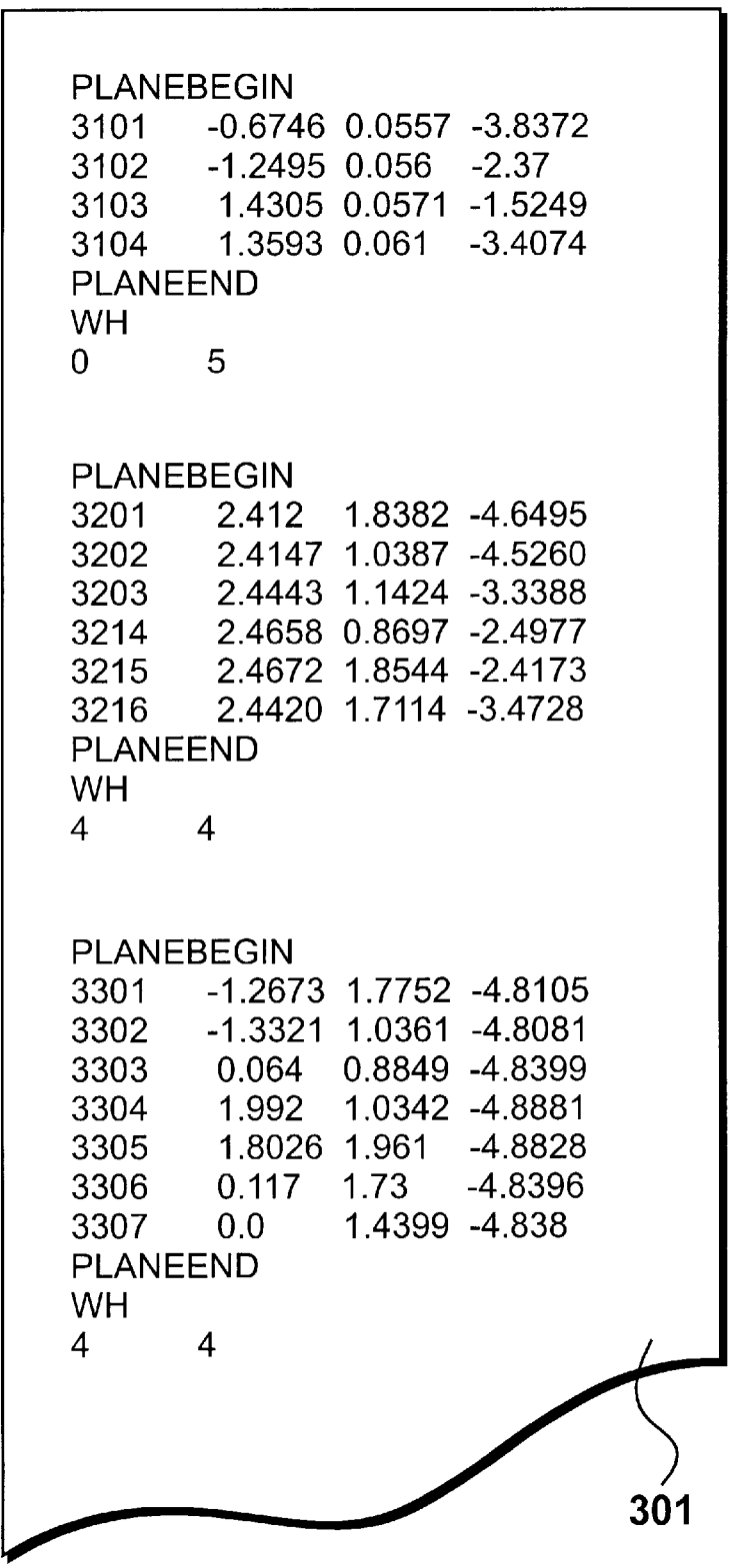
FIG. 3 shows a file format for storing positional data representing the position of walls within the virtual set.

In a similar way, points on the other planes are defined, which, as shown in FIG. 3, consist of points 3201 to 3216 for a second plane and points 3301 to 3307 for the third plane. The determination of the real geographical positions of planes making up the virtual set is performed initially when a set is created and this process does not need to be repeated unless the actual geometry of the set changes. This information is used in order to calibrate the camera 104 and for a fixed camera of the type shown in FIG. 1, the calibration process is initiated by establishing the fixed camera position such that calibration of the camera is performed once after its position has been fixed and further calibration would be required if the camera is moved within the set.

File 301 is considered as the blue screen specification and the generation of this file may be considered as a blue screen specification process in which the actual geometry of the real set is defined. With location points 110 remaining visible, this process is followed by camera calibration, in which a selection of points 1101 are sighted by the camera in terms of camera alignment and focus. Camera settings are accurately measured and positional values are supplied to the processing system 201. Thus, it is possible for the processing system 201 to compare true positional values of location points 110 from the blue screen specification with values generated by the camera in response to camera location detectors. In this way, it is possible to say that, for a particular output signal generated by the camera, a particular position in real space is being viewed and from a collection of information of this type it is possible to calibrate the camera.

After the calibration process has been performed, location points 110 are effectively removed from view, often by applying additional blue screen paint or by taking similar appropriate measures. In alternative embodiments, several cameras may be calibrated in this way and in further alternative arrangements cameras may be moved along rails provided that accurate positional information is derived when movement of this type takes place. Similarly, provided that it is possible to determine the exact position of a camera, a camera may be supported by a boom allowing relatively free movement in three dimensions.

Having performed the processes of blue screen specification and camera calibration, the processing system 201 is accurately aware of the notional viewing point of the camera 104 with respect to the overall set. Thus, as the camera 104 is adjusted in order to track talent within the set for example, the system 201 receives information from which it is possible to accurately determine positions in the virtual set that are actually being viewed by the camera. Thus, this information may be used in order to combine virtual data with the real data received by the camera 104.

Figure 4:
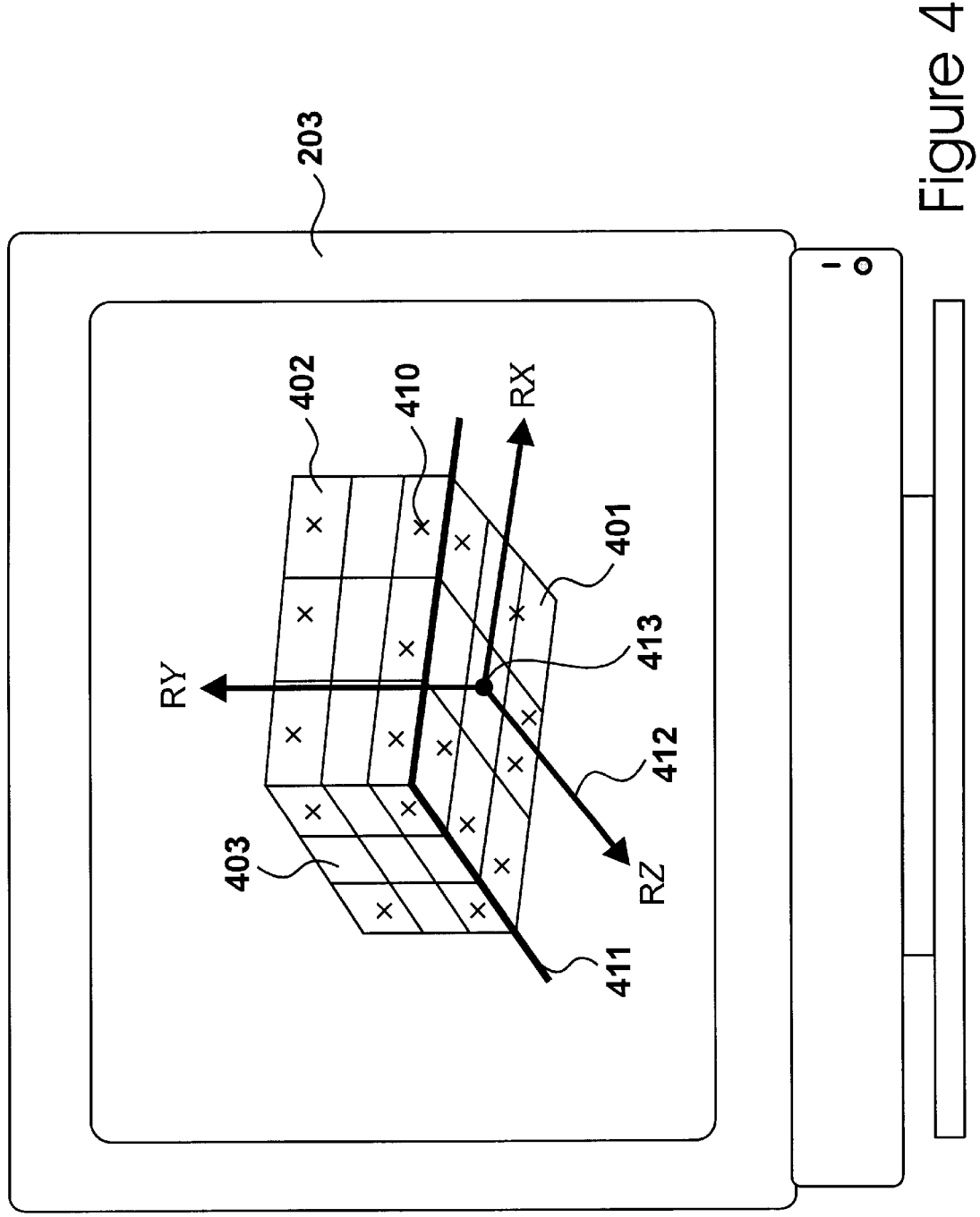
FIG. 4 shows a representation of the blue screen of the virtual set displayed on a visual display unit.

The blue screen specification shown in FIG. 3 is presented to an operator via VDU 203 in a graphical form as illustrated in FIG. 4. The real planes of the real set are displayed as rendered image planes 401, 402 and 403 and the location points used in the blue screen specification process are also displayed in the image as location points 410.

The blue screen specification process allows planes 401, 402 and 403 to be defined in an unbounded way. In order to provide a graphical representation to an operator which is more consistent with the actual geometry of the set, as shown in FIG. 1, the intersections of the plane, along line 411, are inferred thereby defining a partially bounded volume as shown in FIG. 4. Furthermore, to facilitate the manipulation of the image shown in FIG. 4, the RX, RY and RZ axes 412 are displayed, originating from the centrally positioned origin 413.

In the example disclosed so far, the bounding planes represent a cuboid structure, although in alternative embodiments, other geometries may be employed, such as a hexagonal structure requiring the definition of, for example, a total of six planes including the floor.

Figure 5:
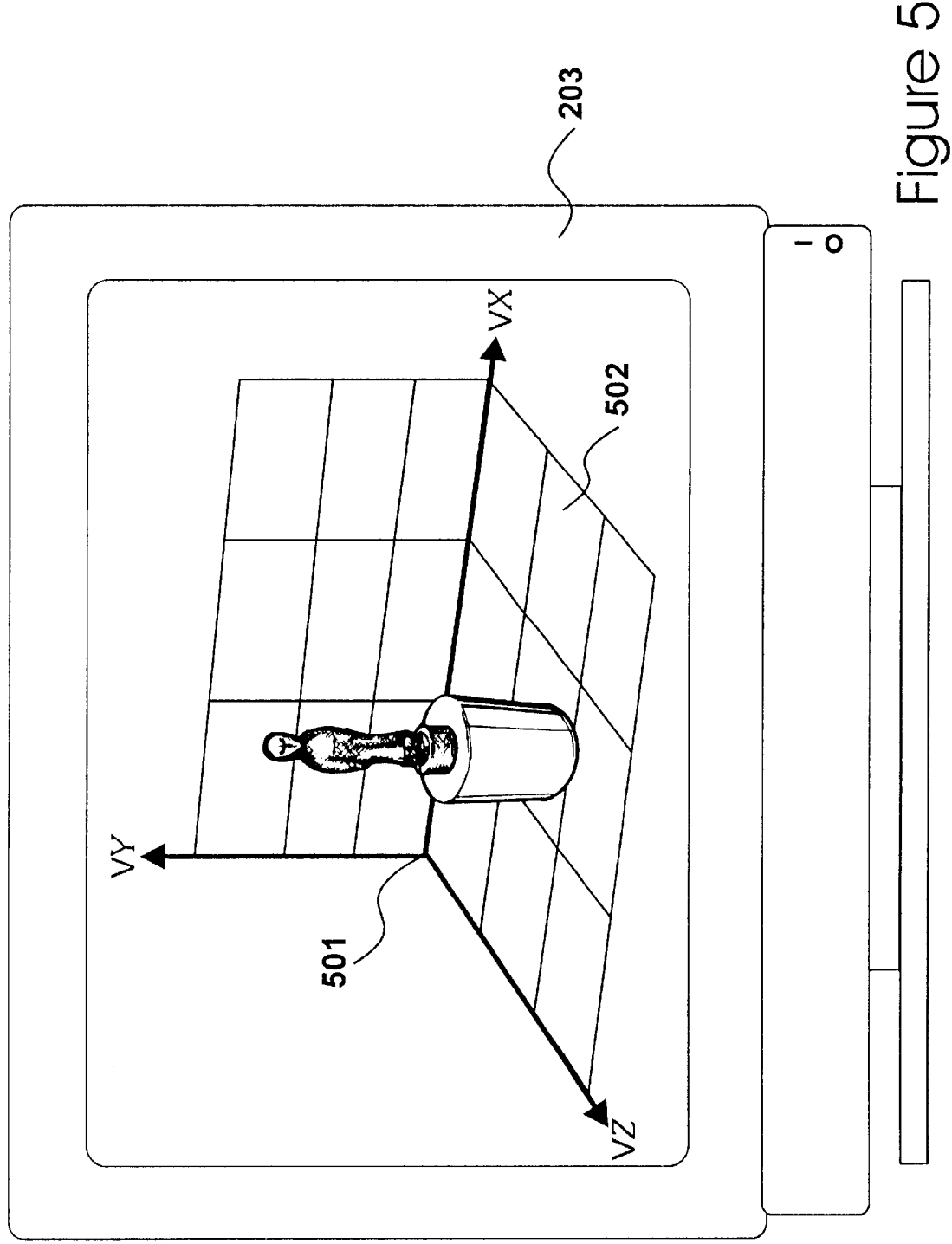
FIG. 5 illustrates a virtual image generated from graphical data and displayed to an operator.

Virtual world spaces are not confined to the actual geometry of the set. However, in order to produce realistic results, particularly when talent interacts with the virtual set, it is necessary for the virtual environment and the real environment to align to some extent such that real physical constraints, such as floors, are reflected in the combined virtual-real image. Thus, it is necessary to enforce some constraints as to the alignment between the virtual images and the real set in order for a level of realism to be achieved. This alignment of the real and virtual environments is referred to as registration and the invention provides for registration data to be created in a systematic way such that the virtual environment may be readily combined with the environment presented by the real set. In particular, a plurality of co-planer points are identified in the real set, as defined by the blue screen specification shown in FIG. 3. These co-planer points are associated to a plane defined in a virtual world space, whereafter differences in position between the real plane and the virtual plane are determined in order to produce registration data. In response to graphical three dimensional data, the processing system 201 is configured to render high definition two dimensional projections at video rate. An example of a synthesized virtual image is shown in FIG. 5, displayed on VDU 203. In use, the virtual image is combined with the real image resulting in output image data which may be displayed on broadcast monitor 202.

The virtual image shown in FIG. 5 has substantially similar geometry to the set displayable as a similar image, as shown in FIG. 4. However, this virtual data has been generated independently of the actual set therefore the orientation of the virtual planes will not exactly align with planes of the real set and a process of registration is required before the two images may be combined. In accordance with convention, the virtual data is specified with respect to axes VX, VY, VZ about an origin 501 and this origin is placed towards the far left corner of the floor and is therefore displaced from the origin of the real set which, as previously stated and as shown in FIG. 4, is positioned at the centre of the floor. Thus, a significant translation is required in order to align the origins of the real and virtual worlds.

The extent to which talent interacts with the real and virtual surfaces will vary depending on a particular application but in most virtual set applications the talent will be seen walking on the floor of the set and therefore it is essential that alignment is achieved between the floor of the real set and the virtual floor generated by the processing system. Thus, although a misalignment between a virtual floor, such as floor 502 and the actual floor surface 101 may be slight, any slight misalignment of this type will produce unacceptable results, given that even minor errors will result in the talent being perceived as floating above the floor or sinking into it. In extreme situations, the virtual environment may have been created in such a way as to be significantly different from the real set and further degrees of transformation may be required in order to bring the two into alignment. An advantage of the present technique is that the extent of any misalignment is of little importance as the process will bring the two worlds into alignment, so that a combination process may take place, irrespective of the extent of any misalignment presently existing.

Figure 6:
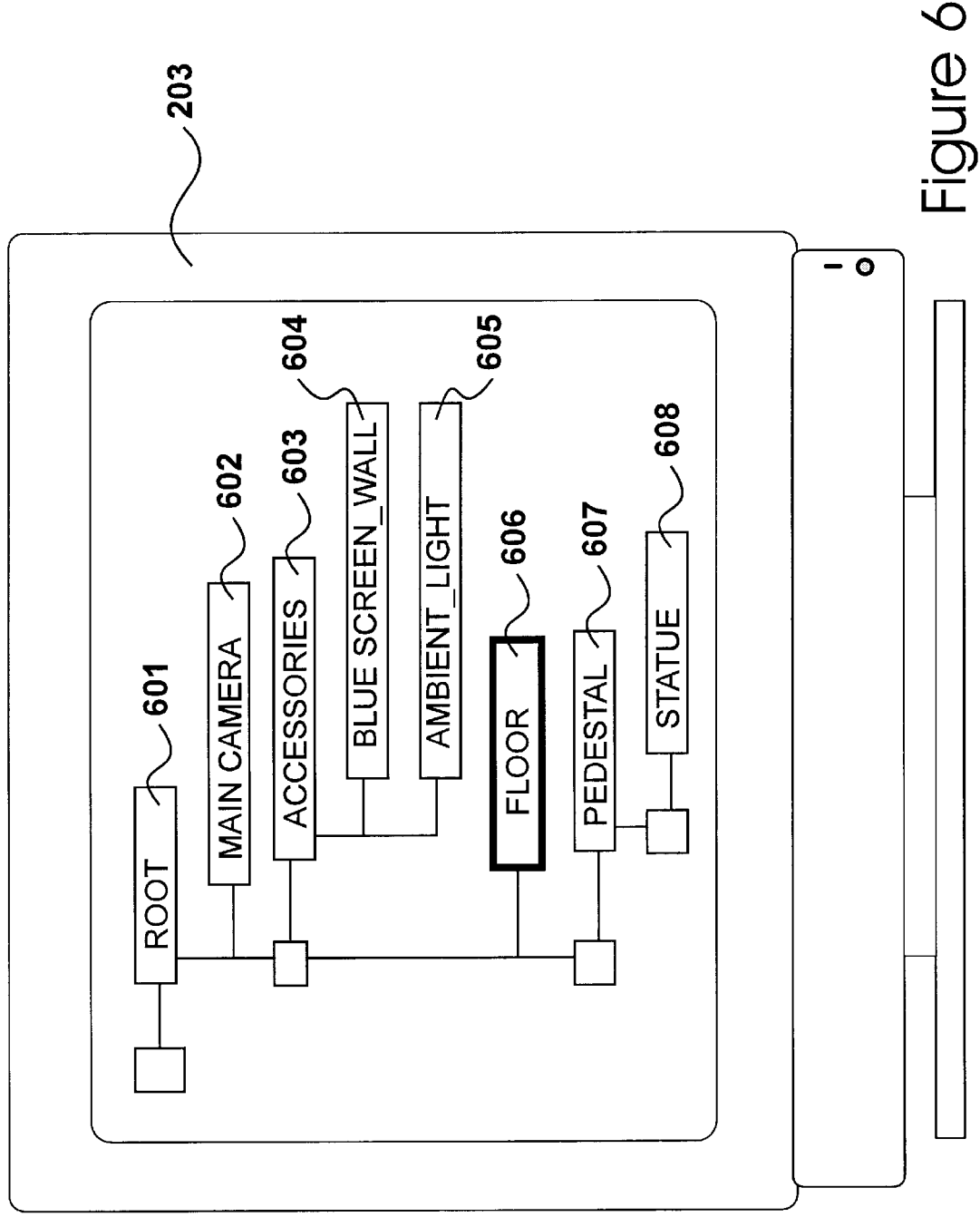
FIG. 6 illustrates how a scene tree for the visual image shown in FIG. 5 is presented to an operator by the visual display unit.

The virtual image shown in FIG. 5 is generated from a hierarchy of object data referred to as a scene tree, which is displayable on monitor 203 as shown in FIG. 6. Thus, as shown in FIG. 6, the virtual environment is derived from a plurality of objects 601 and 608. Object 601 represents a root position defining the orientation of the overall world space with reference to some external origin. Object 602 represents the characteristics of a virtual main camera and the registration process ensures that the characteristics of this camera, defined by object 602, corresponds to the operation of the real camera 104. The background walls (object 604) and ambient lights (object 605) are grouped together as children objects to a parent accessories object 603. In this way, it is possible to perform combined operations upon the blue screen and the ambient light by making modifications to the definitions within the accessories object.

A floor object 606 is a child to the root object 601 with a pedestal object 607 also being a child to the root 601. The pedestal object 607 itself has a child in the form of a statue object 608. In order to align floor 502 of the virtual world with floor 101 of the real set, it would be possible to make modifications to the definition of the floor object 606. Alternatively, modifications could be made to the definition of the root object 601 but then problems may arise in terms of determining the actual nature and extent of any modifications that are made.

Figure 7:
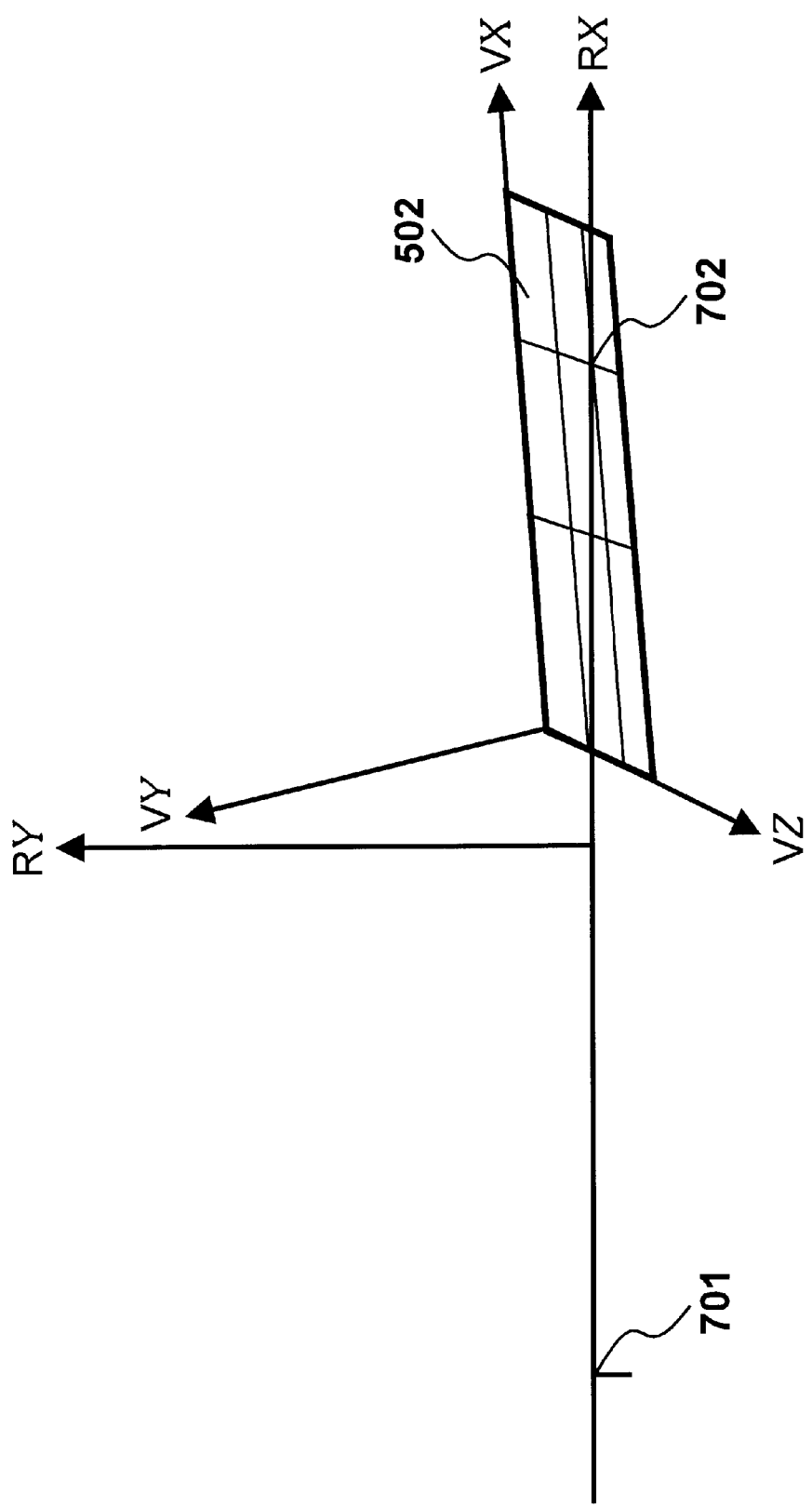
FIG. 7 illustrates problems associated with making modifications to the definition of the position of a virtual floor.

Problems associated with making modifications to the definition of the position of the floor are illustrated in FIG. 7. A cross section normal to the real Z axis RZ is shown such that the real X axis RX is shown horizontally with the real Y axis RY extending therefrom. When optimally aligned to the real axis, the virtual floor 502 would be coincident with the real X axis RX from position 701 to position 702. However, as shown in FIG. 7, the actual alignments given prior to a registration process result in plane 502 occupying a position which is not as is optimally required. The virtual data has been created without reference to the real set therefore the scalings are different and in the example shown in FIG. 7 the virtual floor 502 is smaller than that defined by the extent between the position 701 and position 702. Thus, in order to place the floor 502 in it's required position, it is necessary for it to be enlarged. Due to the selection of different origins between the two world spaces, the virtual floor 502 is translated significantly in both the positive RX and the positive RZ directions. Furthermore, more subtle differences exist in terms of the actual orientation of the plane, such that the virtual plane is effectively rotated about the real X and real Z axes.

Given that the axis of the virtual data may be overlaid with the axis of the real set and displayed on monitor 203, it is possible to perform manual modifications to the scene tree, as illustrated in FIG. 6, so as to achieve a level of alignment. Such a process results in the actual data contained within the scene tree being modified and having done this the resulting scene tree data is now customized for application with the particular real set and only for application with that particular real set. However, a major problem with this approach is that achieving the required level of modification can be a difficult and time consuming exercise and when working with high quality high definition systems such an approach becomes virtually impossible.

Figure 8:
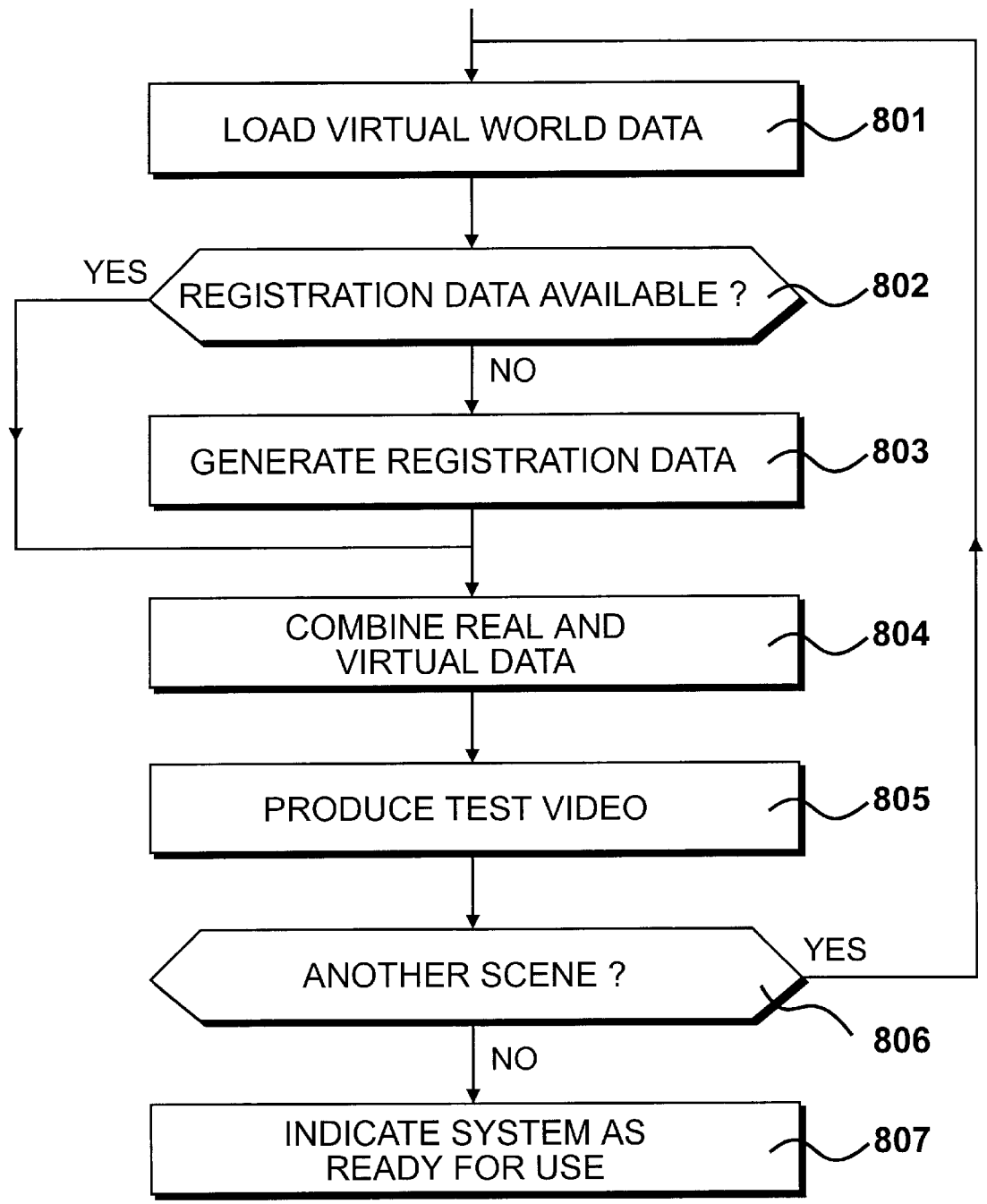
FIG. 8 identifies operations performed in order to prepare the virtual set ready for use, including a step of generating registration data.

Operations performed in order to prepare the virtual set ready for use are illustrated in FIG. 8. The techniques described allow virtual set facilities to be made available to external producers who may approach the facility with their own independently generated virtual designs. The virtual world data generated in this way is loaded into processing system 201 using conventional data conveying media, such as magnetic or optical discs etc. At step 802 a question is asked as to whether registration data is available and if this question is answered in the negative, registration data is generated at step 803.

At step 804 the real image data and the virtual image data are combined so as to establish the virtual set environment. If the question asked at step 802 was answered in the affirmative, to the effect that registration data is already available, step 804 is initiated, whereafter at step 805 it is possible to test the output video results, so as to allow the system to be operational while making modifications to any other appropriate perameters, such as lighting or the presence of real objects within the set.

At step 806 a question is asked as to whether another scene is to be considered and when answered in the affirmative new virtual world data is loaded at step 801 and steps 802 to 805 are repeated. Thus, these procedures are repeated until all of the scenes have been processed resulting in the question asked at step 806 being answered in the negative. At this point, all of the scenes will have been tested at step 805 such that at step 807 the system indicates the condition as being ready for use so that output video signals may be generated for recording or broadcast.

Figure 9:
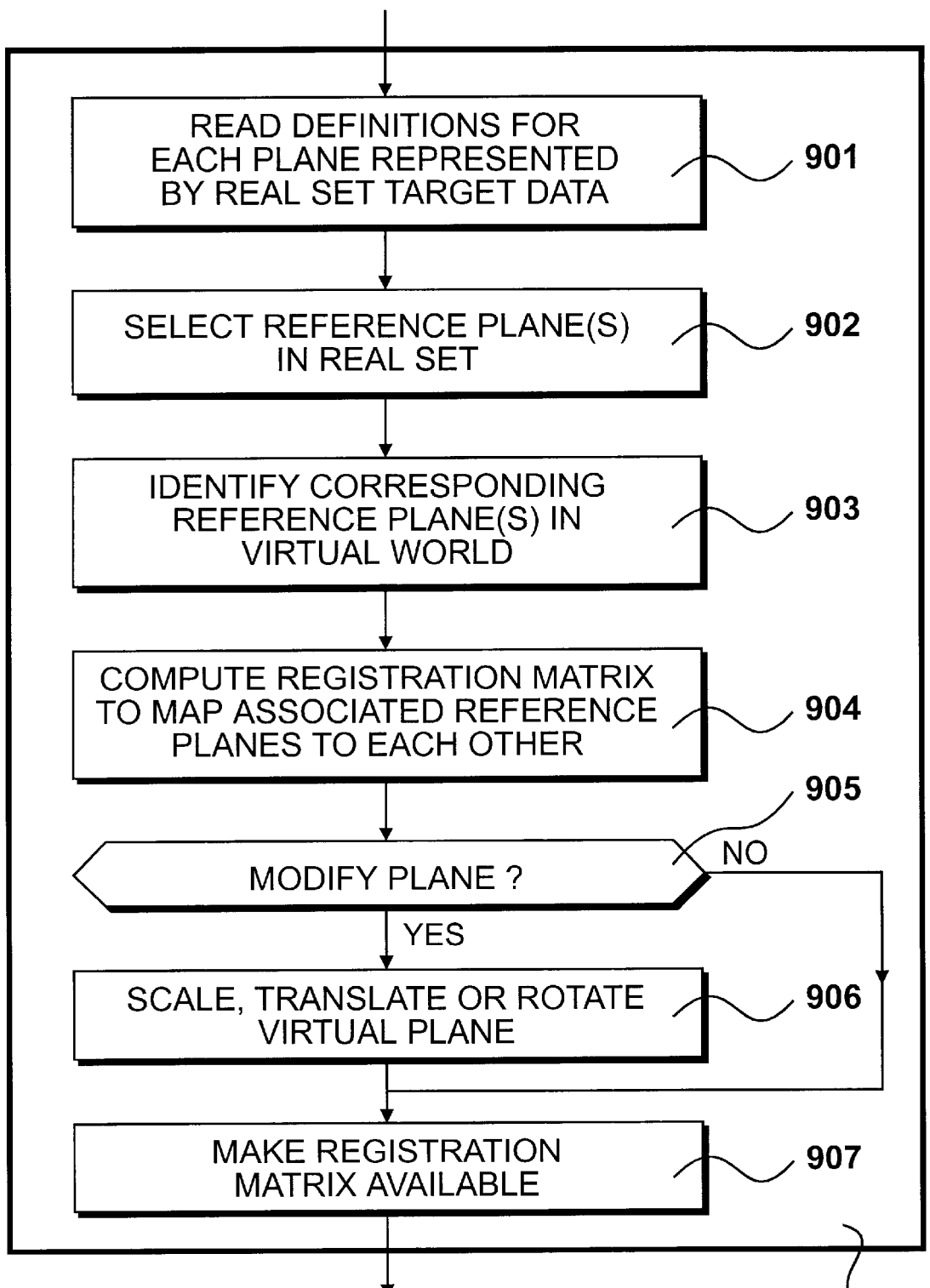
FIG. 9 details the registration data generation step identified in FIG. 8, including a matrix generation step.

Step 803 for the generation of registration data is detailed in FIG. 9. At step 901 definitions for planes of the real set are read; this data having been generated during the blue screen specification process. At step 902 a reference plane, or a plurality of reference planes, in the real set is selected and at step 903 corresponding reference planes in the virtual world space are identified. At step 904 a registration matrix is computed so as to map associated reference planes to each other. In the preferred embodiment a single reference plane (usually the floor) is selected. Thus, at step 902 the real floor of the real set shown in FIG. 1 would be selected as the real plane and at step 903 a plane representing the floor of the virtual world space would be selected. Thereafter, the registration matrix generated at step 904 will map the virtual floor onto the real floor within the real set.

At step 905 an operator is invited to make modifications to the presentation of the virtual image, within permitted constraints, such that at step 906 an operator may scale, translate or rotate the virtual image. Modifications of this type are implemented by making changes to the registration matrix such that artistic modifications may be made within the definition of the matrix in addition to the automated registration procedure. Thereafter, at step, 907 the registration matrix is made available to the production personnel.

Definitions read at step 901 include plane equations of the form detailed in FIG. 10. A plane may be represented by a normal which is perpendicular to the plane and in three dimensions this will be represented by an equation in the form ax+by+cz+d=0. An equation of this type may be defined with reference to at least three co-ordinates supplied from measurement performed with respect to the real set shown in FIG. 1. The equations for obtaining values for a b c and d in the plane equation are shown in FIG. 10. However, it should be understood that more than three points may be used in combination with equations of this type in order to obtain more accurate values for a b c and d, given that a small degree of error is likely in the measurement of points 110 shown in FIG. 1.

Figure 11:
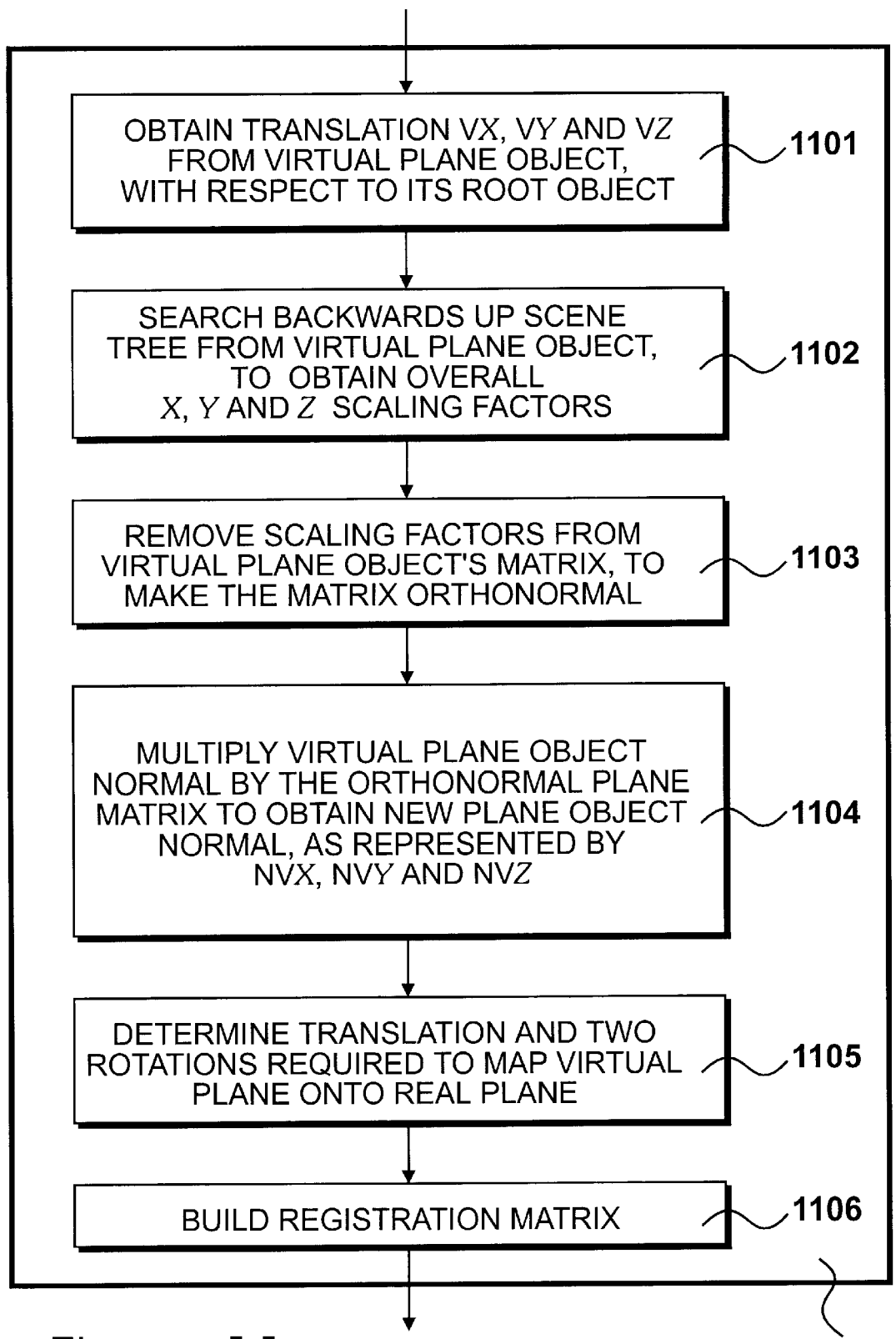
FIG. 11 details the registration matrix generation step identified in FIG. 9, including a translation and rotation determination step.

Step 904 for the generation of the registration matrix is detailed in FIG. 11. At step 1101 values defining the displacement, in terms of a translation, between the selected virtual plane (floor 606) and the main root origin are determined. In the scene tree, the selected virtual plane is represented as a bounded rectangle, given that objects in the virtual environment are defined with finite extent. By convention, objects defined in the scene tree shown in FIG. 6 have absolute co-ordinate references therefore a displacement or translation may be determined by calculating the difference between absolute positions for the object and it's origin. Thus, at step 1101 translation values VX, VY and VZ are determined for the virtual plane object with respect to it's root object.

The nature of the scene tree allows scaling factors to be introduced at each node such that the overall scaling for a particular object will be derived from a concatenation of the scaling factors applied at each branching point. In the present process, it is necessary to remove scaling factors therefore at step 1102 a search is performed backwards up the scene tree from the virtual plane object to obtain overall X, Y and Z scaling factors, achieved by a process of multiplying each scaling factor encountered while traversing up the tree. Thus, at step 1103 the scaling factors are removed from the virtual object's matrix so as to make the matrix orthonormal.

At step 1104 the normal vector of the virtual plane object is multiplied by the orthonormal plane matrix, derived at step 1103, to obtain a new virtual plane object normal, represented as NVX, NVY and NVZ. This matrix multiplication results in the generation of a normal of unit magnitude identifying a direction normal or orthogonal to the required position of the virtual plane.

Having determined the nature of a translation required in order to move the virtual plane to the position of the real plane at step 1101, rotations are determined at step 1104. These operations are then combined at step 1105 in order to determine the overall transformation, in terms of a translation and two rotations, required in order to map the virtual plane onto the real plane. Thereafter, at step 1006, the registration matrix is built, effectively representing the transformation determined at step 1105.

Figure 12:
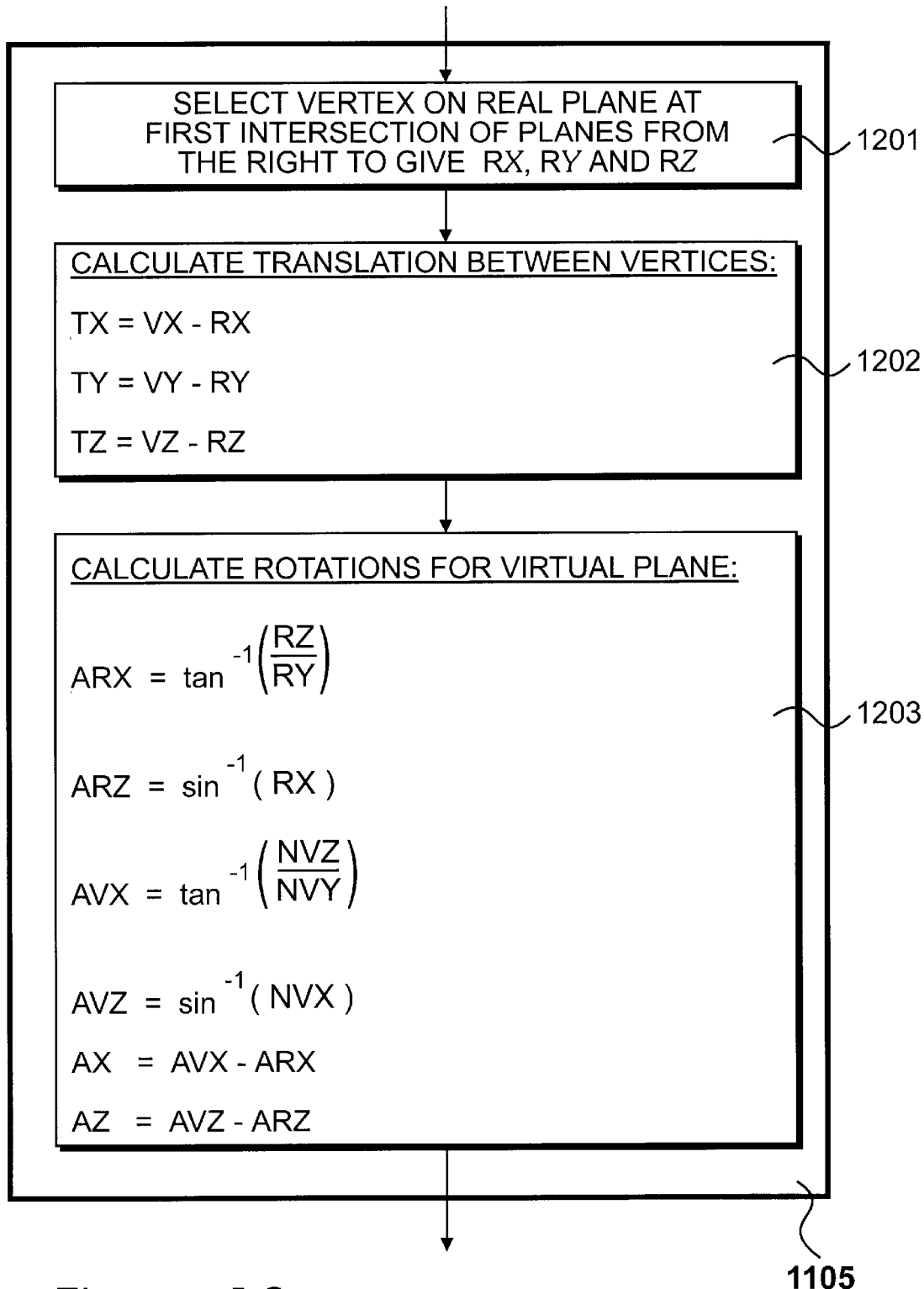
FIG. 12 details the translation and rotation determination step identified in FIG. 11, for the generation of transformation matrices and the generation of a registration matrix.

Step 1105 for the transformation determination is detailed in FIG. 12. At step 1201 a vertex on the real plane is selected which, in the preferred embodiment, is based on selecting the first point at the intersection of planes, moving from the right of the image towards the left of the image, to identify a real co-ordinate point (RX, RY, RZ).

At step 1202 a translation between vertices is calculated by subtracting the real values selected at step 1201 from their equivalent virtual values to give component translation values. Thus, the translation value in the X dimension is given as the difference between the virtual X position VX and the real X position RX. Similarly, TY is given by VY minus RY and TZ is given by VZ minus RZ. The values for VX, VY and VZ are the same values determined in step 1101, shown in FIG. 11.

At step 1203 calculations are performed in order to identify rotations required for the virtual plane in order to map it onto the real plane. An initial calculation is performed in order to determine a rotation about the real X axis for the real plane and this is given by the arctangent of (RZ/RY) which is denoted by the angle ARX. A similar calculation is performed in order to obtain an angle ARZ, which is given by the arcsine of (RX). The calculation of ARZ is simplified with the knowledge that the plane object normal is of unit magnitude.

An equivalent pair of rotations is calculated with respect to the orientation of the virtual plane object, resulting in a pair of angles AVX, which is the rotation about the X axis, and AVZ, which is the rotation about the Z axis. At this point two pairs of angles have been calculated in the real set, and this pair of angles corresponds to the rotation that would be required in order to align the real set floor with the real RX RY and RZ axes. In the virtual set, the pairs of rotations corresponds to the rotation that would be required in order to align the virtual floor with the virtual axes VX VY and VZ. Thus, by combining these pairs of angles corresponding to the real and virtual rotations, the total rotation required in order to align the virtual floor with the real floor is given. Thus the total rotation about the X axis, AX, is given by AVX minus ARX and the total rotation about the Z axis, AZ, is given by AVZ minus ARZ.

Having calculated the translations TX, TY and TZ in each of the three dimensions at step 1202, and having calculated the two rotations AX about the X axis and AZ about the Z axis at step 1203, it is now possible to process these values in order to generate the registration matrix. Referring to FIG. 13, the registration matrix is calculated by the concatenation of an identity matrix 1301, with an X rotation matrix 1302 and a Z rotation matrix 1303. The final column of the matrix is then substituted with the translation values TX, TY TZ and unity.

The X rotation matrix shown in FIG. 13 is derived by calculating the cosine and sine of the X rotation value, whereafter appropriate entries are made as illustrated at 1302. Similarly, the Z rotation matrix is determined from the cosine and sine of the Z rotation angle with appropriate substitutions being made as illustrated 1303. Referring to FIG. 14, matrix manipulations are illustrated at 1401, resulting in a registration matrix as illustrated at 1402.

An example of a registration matrix stored as an ASCII file by processing system 201 is illustrated in FIG. 15. The matrix is represented as a four by four array of values stored to an appropriate level of accuracy; in the example, each entry is stored to an accuracy of four decimal places.

The scene tree illustrated in FIG. 6 is represented as a file stored by system 201 as illustrated in FIG. 16. Thus, the virtual graphics information stored in a file of the type shown in FIG. 16 in combination with it's associated registration matrix stored in a file of the type shown in FIG. 15 allows the virtual environment and the real environment to be successfully combined. Thus, the registration matrix file in FIG. 15 effectively provides a bridge between the independently generated virtual world space and the real environment of the set. Furthermore, the virtual graphical information stored in a file of the type shown in FIG. 16 is not modified and, in combination with other appropriately generated registration matrices, may be employed in other unrelated virtual sets.

Figure 17:
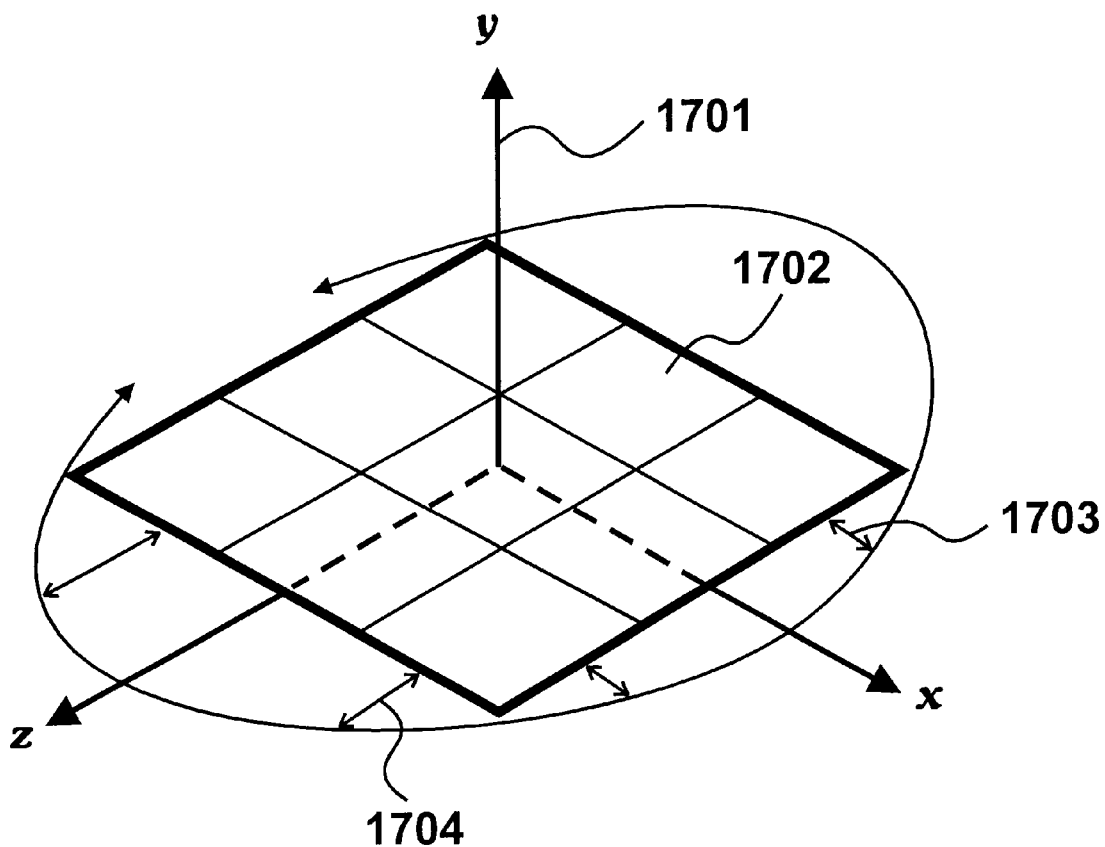
FIG. 17 illustrates a relationship between a real floor and a virtual floor.

In the preferred embodiment, a floor in the virtual world space is registered to the floor of the real set such that planar coincidence exists within the two worlds. This relationship is illustrated in FIG. 17, wherein the whole set may be considered as partially or semi-constrained. The X Y and Z axis 1701 represent the axis of the real space whereas rectangle 1702 is an object derived from the virtual world registered to the XZ floor of the real space. Thus, the virtual floor defines a plane which is coincident with a plane defined in the real set. Modifications may be made to the registration provided that the real plane and the virtual plane remain coincident. Thus, the virtual plane may be rotated about the Y axis or it may be scaled in both the X and Z directions, as indicated by arrows 1703 and 1704 respectively.

Figure 18:
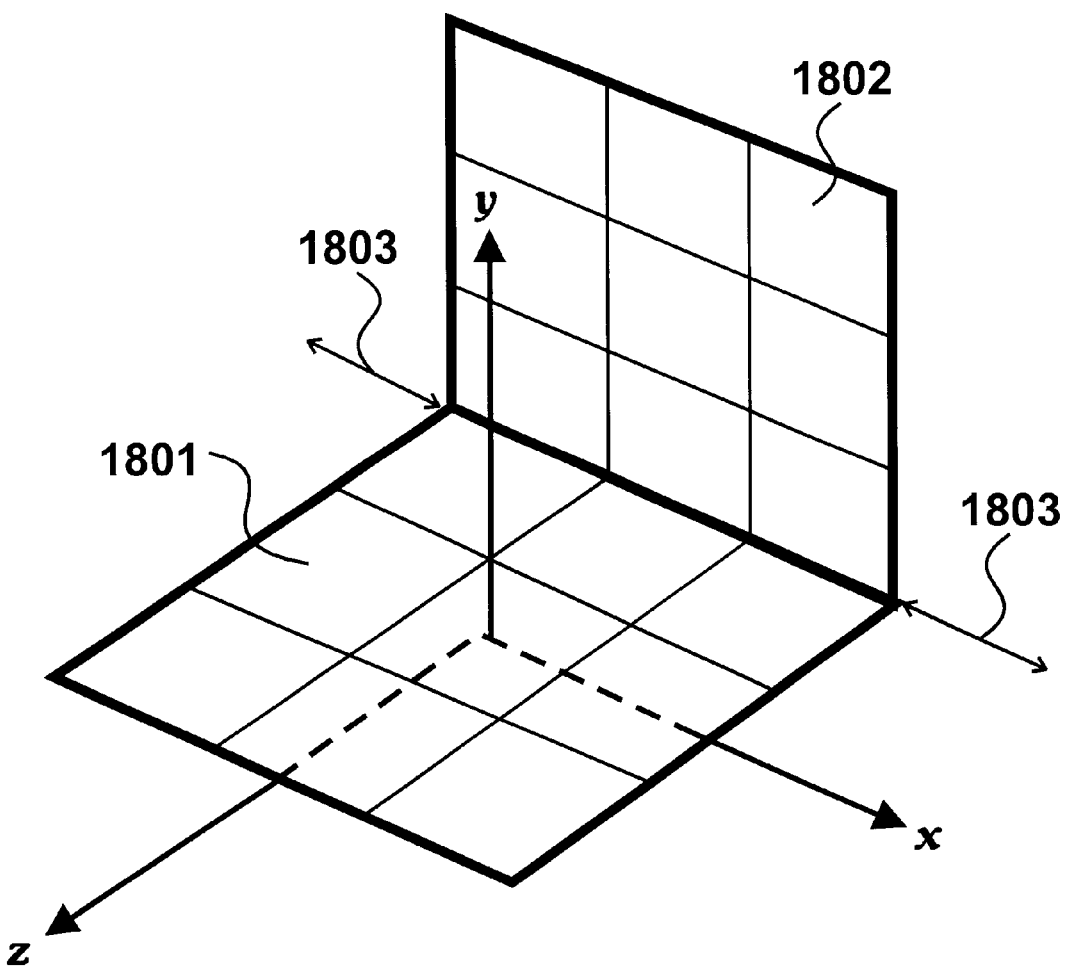
FIG. 18 illustrates an alternative relationship between planes of a virtual world and planes of the real set.

In alternative embodiments, further levels of constraint may be applied. In FIG. 18, the virtual environment is registered to the real environment in a first plane 1801, similar to plane 1702 in FIG. 17. In addition, the virtual environment is also registered to a second plane 1802. The geometrical relationship between these two planes is not in itself constrained but having constrained the relationship in one environment, usually the real environment, it is necessary for the same constraint to be applied within the virtual environment. Once registered in this way, the amount of modification that may be effected is significantly reduced when compared to the levels of modification allowed in the arrangement shown in FIG. 17. In the arrangement shown in FIG. 18, the planes are restrained in both the Y and Z dimensions. However, it is possible to effect translation and scaling along the intersection of planes 1801 and 1802, as indicated by arrows 1803.

What is claimed is:

1. A method of generating registration data for a virtual set comprising:
    identifying a plane in a real set;
    associating said real plane to a plane defined in a virtual scene; and
    determining differences in position between said real plane and said virtual plane to produce registration data, wherein said registration data defines a transformation for the virtual scene to facilitate the combination of said virtual scene with image data derived from the real set.

2. A method according to claim 1, wherein planes in said real set are defined by identifying the position of a plurality of co-planar points.

3. A method according to claim 1, wherein a plurality of planes are identified in the real set and each of said planes is associated to a respective plane in the virtual scene.

4. A method according to claim 1, wherein said virtual scene data is defined by a scene tree, relating a plurality of objects with respect to a root origin.

5. A method according to claim 1, wherein said position determining step includes removing scaling effects from said virtual plane with reference to a scene tree of objects.

6. A method according to claim 1, wherein said difference determining step includes determining a relationship between a real plane and a corresponding virtual plane in terms of translations and rotations.

7. A method according to claim 6, wherein said rotations and translations are defined by matrices and a registration matrix is generated by a concatenation of said rotation and translation matrices.

8. The method of claim 1 wherein:
    the identifying of the real plane in the real set, is effected with respect to a first three dimensional co-ordinate origin;
    identifying the virtual plane in the virtual set is effected with respect to a second three dimensional co-ordinate origin;
    the determining of said differences is effected by comparing a vertex on each said plane with its respective origin, to obtain a transformation; and
    said transformations are combined to generate said registration data.

9. A method according to claim 8, wherein said registration data is further modified by an operator, such that multiple registration data sets may be defined for a unique real set virtual set combination.

10. A method according to claim 8, wherein a plurality of planes is identified for combination in each of said real and virtual sets.

11. A method of generating registration data for a virtual set, comprising:
    identifying a three-dimensional registration object in a real set;
    identifying a three-dimensional model of said registration object in a virtual set; and
    combining real and virtual positions of said registration object in order to generate said registration data.

12. A method of combining virtual scene data with images from a real set, comprising:
    generating an image of a real set;
    rendering an image of a virtual set from said virtual scene data, in combination with registration data; and
    combining said real image with said rendered image wherein said registration data is determined by a process of matching a positional attribute of a plane common to said real set and said virtual set.

13. A method of producing image data in a virtual set, comprising:
    loading virtual scene data;
    generating registration data; and
    using said registration data to combine real and virtual images, wherein said registration generation comprises:
        identifying a real plane in said real images;
        associating said real plane to a plane defined in a virtual scene, and
        determining differences in position between said real plane and said virtual plane to produce registration data.

14. An apparatus for generating registration data for a virtual set, comprising:
    means for identifying the real plane in the real set;
    means for associating said real plane to a virtual plane defined in a virtual set;
    means for determining differences in position between said real plane and said virtual plane to produce registration data, wherein said registration data defines a transformation for virtual scene data to facilitate the combination of said virtual data with image data derived from the real set; and
    means for employing said registration data to align the virtual plane with the real plane.

15. Apparatus according to claim 14, including means for identifying the position of a plurality of co-planar points in order to define a plane in said real set.

16. Apparatus according to claim 14, including means for identifying a plurality of planes in the real set and means for associating each of said planes to a respective plane in the virtual scene.

17. Apparatus according to claim 14, including means for defining the virtual scene data by a scene tree, wherein said scene tree relates a plurality of objects with respect to a root origin.

18. Apparatus according to claim 14, including means for removing scaling effects from the virtual plane with reference to a scene tree of objects.

19. Apparatus according to claim 14, including means for determining a relationship between a real plane and a corresponding virtual plane in terms of translations and rotations.

20. Apparatus according to claim 19, including means for defining said rotations and translations in the form of matrices, including means for generating a registration matrix by a concatenation of said rotation and translation matrices.

21. A computer-readable medium having computer-readable instructions executable by a computer to generate registration data for a virtual set, said registration data being required to facilitate alignment of virtual scene data with real set data, such that the computer performs the steps of
    reading data representing a selected reference plane in a real set;

identifying a corresponding virtual plane from said virtual scene data; and computing a registration matrix to map said real reference plane to said corresponding virtual plane.

22. A computer-readable medium having computer-executable instructions for performing the steps according to claim 21, wherein a translation between said vertices is calculated.

23. A computer-readable medium having computer-executable instructions for performing the steps according to claim 22, wherein rotations of said virtual plane are calculated.

24. A computer-readable medium having computer-executable instructions for performing the steps according to claim 23, wherein said registration data is defined in terms of a four-by-four array of characters.

* * * * *